United States Patent [19]
Warren

[11] Patent Number: 5,616,091
[45] Date of Patent: Apr. 1, 1997

[54] INTEGRATED HYDRO-MECHANICAL MULTIPLE LOCKUP TRANSMISSION

[76] Inventor: Walter S. Warren, 14 Chapman Road, Winnipeg, Manitoba, Canada, R2Y 1J8

[21] Appl. No.: 387,165

[22] Filed: Feb. 13, 1995

Related U.S. Application Data

[63] Continuation-in-part of Ser. No. 905,334, Jun. 23, 1992, abandoned, which is a continuation-in-part of Ser. No. 774,555, Oct. 10, 1991, Pat. No. 5,203,747.

[51] Int. Cl.$^6$ .................................................. F16H 47/04
[52] U.S. Cl. ............................. 475/72; 475/82; 475/122
[58] Field of Search ................................. 475/72, 73, 75, 475/78, 80, 122, 82; 60/490

[56] References Cited

U.S. PATENT DOCUMENTS

| | | | |
|---|---|---|---|
| 2,463,950 | 3/1949 | Carroll | 60/491 X |
| 2,484,789 | 10/1949 | Hill et al. | 418/21 |
| 2,645,903 | 7/1953 | Elkins | 418/21 |
| 2,666,293 | 1/1954 | Vigneau | 418/21 |
| 3,345,885 | 10/1967 | Tschanz | 475/72 |
| 3,404,584 | 10/1968 | Trautmann | 475/72 |
| 3,842,694 | 10/1974 | Marlow | 475/83 |
| 3,890,360 | 6/1975 | Pruvot et al. | 477/68 X |
| 4,082,013 | 4/1978 | Dornfeld et al. | 475/76 X |
| 4,091,690 | 5/1978 | Miyao | 477/47 |
| 4,232,570 | 11/1980 | Gibson | 477/68 |
| 4,232,572 | 11/1980 | Ross et al. | 477/68 X |
| 4,291,594 | 9/1981 | Baudoin | 477/39 |
| 4,353,272 | 10/1982 | Schneider et al. | 477/43 |
| 4,497,223 | 2/1985 | Maruyama et al. | 477/68 |
| 4,646,521 | 3/1987 | Netherlands | 60/491 |
| 4,680,986 | 7/1987 | Elsner | 475/267 X |
| 4,991,465 | 2/1991 | Hurth | 477/155 |
| 5,193,416 | 3/1993 | Kanayama | 475/72 X |
| 5,203,747 | 4/1993 | Warren | 475/72 |
| 5,403,241 | 4/1995 | Jarchow et al. | 475/72 |
| 5,496,223 | 3/1996 | Jarchow | 475/72 |

FOREIGN PATENT DOCUMENTS

| | | | |
|---|---|---|---|
| 2646380 | 11/1990 | France | 475/83 |
| 58-46246 | 3/1983 | Japan | 475/72 |
| 5-215200 | 8/1993 | Japan | 475/72 |
| 6-101744 | 4/1994 | Japan | 475/72 |
| 8204599 | 6/1984 | Netherlands | 418/21 |

*Primary Examiner*—Khoi Q. Ta
*Attorney, Agent, or Firm*—Adrian D. Battison; Murray E. Thrift

[57] ABSTRACT

An integrated hydro-mechanical transmission having the capability of achieving continuous variability from zero to maximum in both the forward and reverse vehicle directions and having the additional capability of automatically locking up for direct mechanical drive in at least one operator selectable drive range corresponding to typical city, suburban and highway driving. Intended for use in all types of highway vehicles.

17 Claims, 7 Drawing Sheets

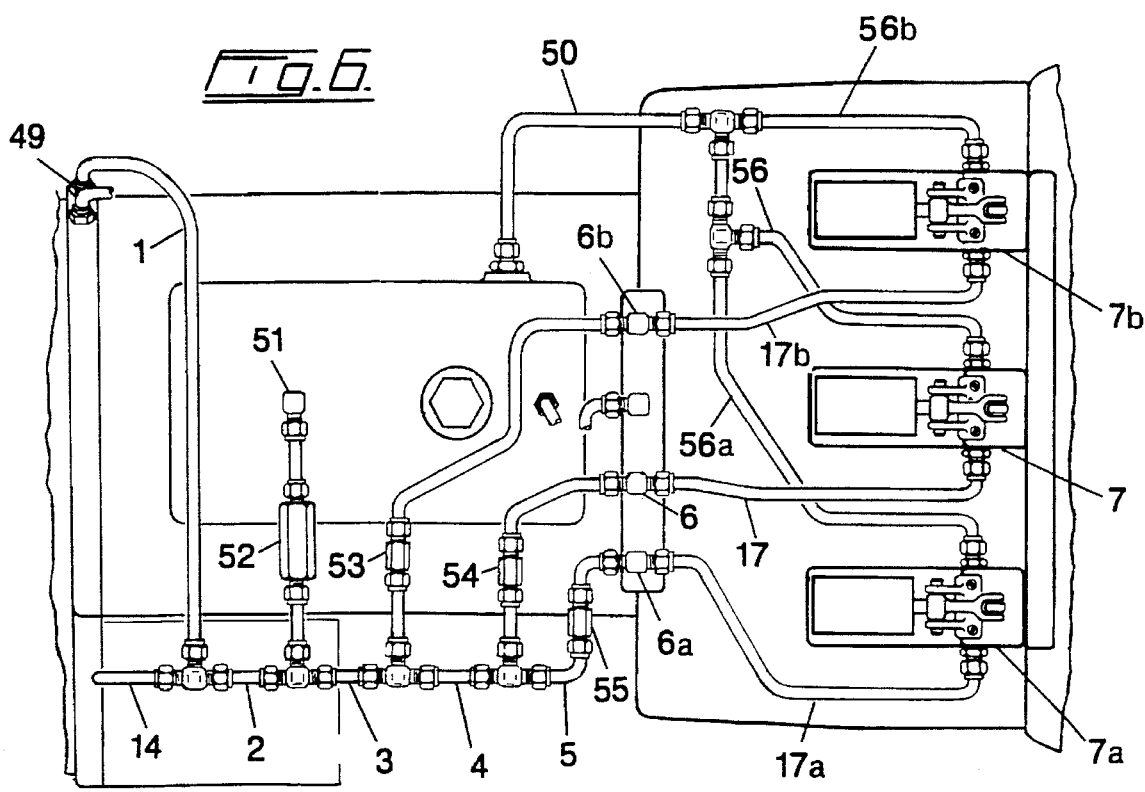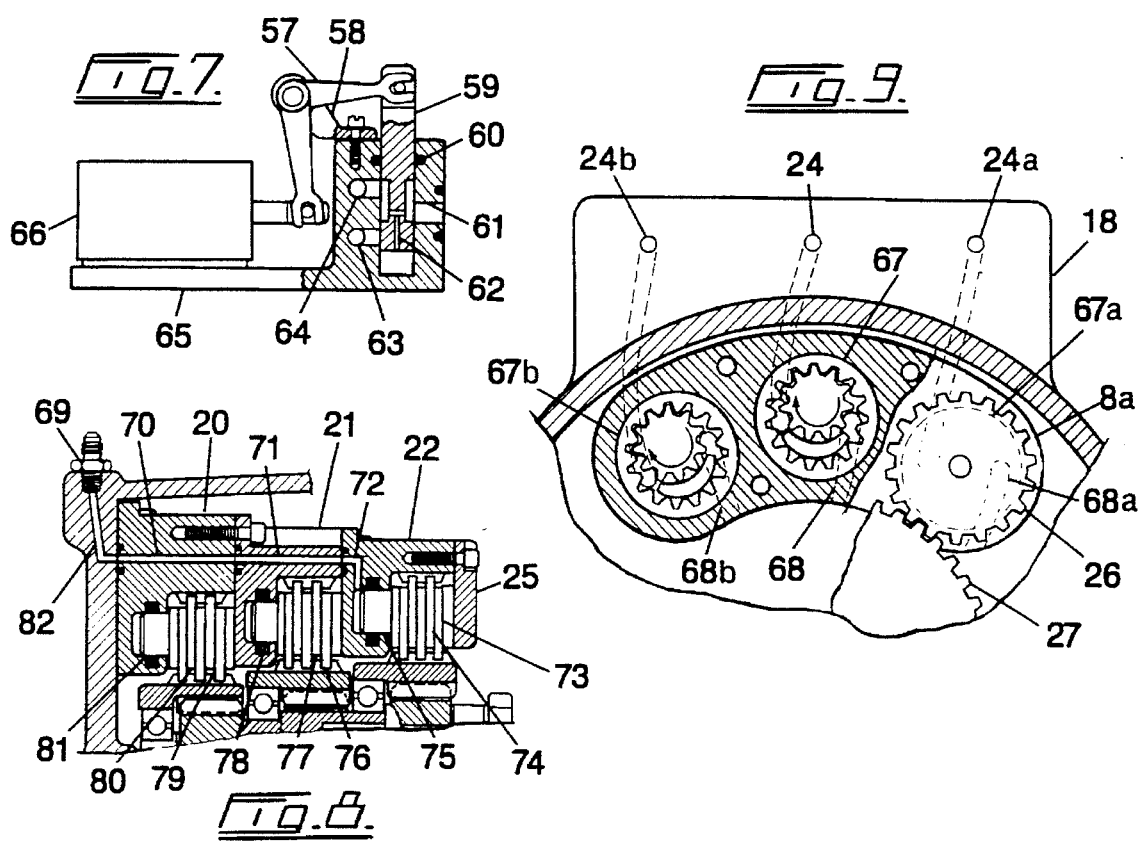

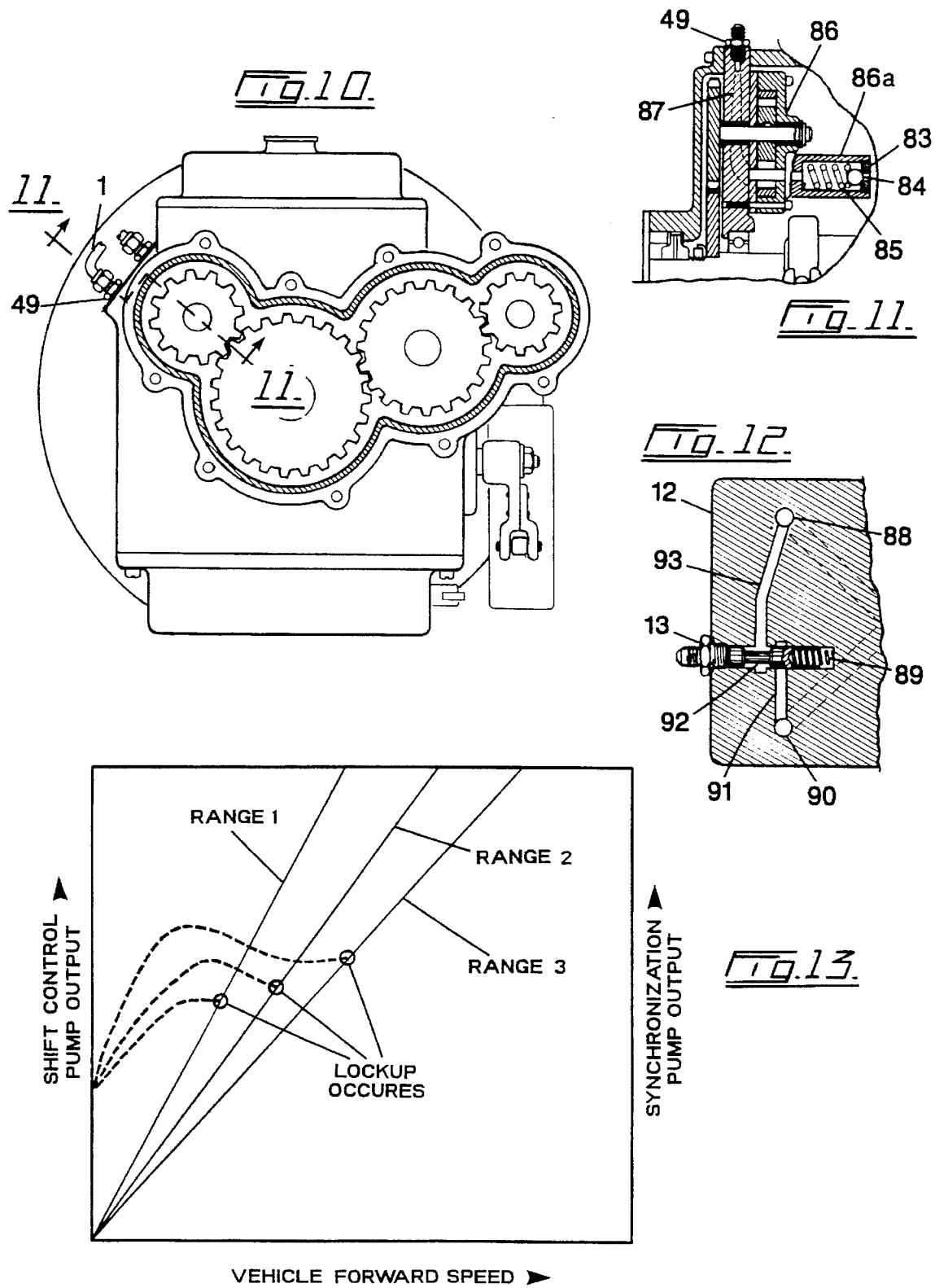

INTEGRATED HYDRO-MECHANICAL MULTIPLE LOCKUP TRANSMISSION

CROSS REFERENCE TO RELATED APPLICATIONS

This application is a continuation-in-part of application Ser. No. 07/905,334 filed Jun. 23, 1992, now abandoned, which is a continuation-in-part of application Ser. No. 07/774,555 filed Oct. 10, 1991, now issued as U.S. Pat. No. 5,203,747, and is related to co-pending application Ser. No. 08/387,194 filed Feb. 13, 1995 and which was allowed on May 22, 1996, which is a continuation of application Ser. No. 07/905,334, the disclosure of which is incorporated herein by reference. U.S. Pat. No. 5,203,747 describes an integrated hydro-mechanical transmission having continuous, through zero, variability in output, from maximum forward to maximum reverse, and intended for use in heavy duty, drive-wheel-steered applications. Patent application Ser. No. 07/905,334 and the related application filed simultaneously herewith describe the further innovations required to adapt the aforementioned transmission for automobile and similar applications.

BACKGROUND TO THE INVENTION

1. Field of the Invention

This invention relates to automotive power transmissions, and in particular to infinitely-variable, hydrostatically-based transmissions having a lockup capability in one or more ranges.

2. Description of the Related Art

Current automatic transmissions used in the larger full-sized automobiles lighter duty trucks and passenger vans generally feature some sort of torque converter lockup or overdrive. The transmission goes into the lockup mode or overdrive range when selected by the operator, and after attaining the predetermined speed and engine torque parameters. When the transmission is in lock up mode, the torque converter is by-passed and the engine is mechanically coupled to the vehicle drive wheels. This lockup or overdrive incorporates a higher drive ratio than is achieved without it, which makes this transmission ideal for extended highway driving. As well, because of the direct mechanical coupling between the engine and the drive wheels when in overdrive, this transmission approaches the fuel economy levels of conventional manual shift transmissions for long distance highway driving, especially where heavy loads or frequent steep terrain do not cause it to go out of the overdrive mode a significant amount of the time. Of course, in city driving the vehicle speeds attained are not usually sufficient for the lockup mode to engage; hence, similar efficiencies cannot be achieved in this instance.

In heavier-duty double-axle trucks, automatic transmissions with multiple lockup modes are sometimes used. In the large highway transport tractor units, as well as in the larger four-wheel-drive farm tractors, hydraulically-clutched, multi-ratio mechanical transmissions, sometimes incorporating several dozen discreet drive ratios, are generally used. This multiplicity of mechanical drive ratios, coupled with hydraulically-controlled automatic shifting and clutching, makes it possible to completely dispense with a torque converter. What these machines rely on instead of a smooth stepless change of ratios during acceleration is the fact that the adjacent drive ratios are so close together that the virtually instantaneous shifting results in such small incremental changes in engine RPM that the engine and drive train components are not unduly stressed. However, in order to achieve the large number of discreet drive ratios required, the transmission must be very large and, consequently, very expensive.

SUMMARY

The integrated hydro-mechanical transmission described in patent application Ser. No. 07/905,334 has the capability of achieving continuous non-stepped variability during acceleration from zero (vehicle stopped) to maximum forward (or reverse, if selected). In this transmission, the drive ratios automatically increase in a smooth, stepless manner as the engine RPM is increased. Conversely, the transmission ratios tend to automatically decrease in response to torque loading applied to the transmission output shaft. In addition, this transmission incorporates two operator selectable inputs—one a "trim" selector for operator biasing of the relative "weights" that the transmission control mechanisms will place on the two automatically sensed inputs (engine RPM and output loading), and a second operator selectable input analogous to the "kickdown" or passing mode in a conventional automatic transmission, wherein the transmission temporarily downshifts for quick acceleration whenever the accelerator pedal is fully depressed.

While the integrated hydro-mechanical transmission described above would significantly surpass that of a conventional automatic transmission in mechanical efficiency (higher fuel economy), it would not quite match that of a manual shift transmission. However, it is possible to match up this integrated hydro-mechanical transmission with one or more multiple lockup clutches in such a way that the initial startup of the vehicle from a stopped position would be accomplished by the integrated hydro-mechanical portion of the transmission and, at such time as the predetermined ratio of vehicle speed versus engine RPM was reached, automatic lockup would occur at whichever driving range was selected. Subsequent change to another driving range (from city to suburban, or suburban to highway) would be easily and simply achieved by depressing the push-button for the range desired.

A necessary prerequisite of such lockup, however, is that it must be achieved smoothly and without significant power surges. This mandatory condition is met in the subject invention by employing the principles set forth in U.S. Pat. No. 3,329,470 by the undersigned and titled "Synchronization Device for Two or More Rotatable Components". This is achieved by selectively coupling one of three incrementally larger gear-type, miniature hydraulic synchronization pumps, which are driven by the transmission output shaft in a series back-to-back hydraulic circuit with the miniature hydraulic pump used to operate the shift control mechanism in the basic transmission, and which is driven at the engine RPM by the transmission input shaft. The three individually-selectable miniature hydraulic pumps are sized such that their volumetric output equals that of the control pump at the desired lockup speed for the range selected.

Since the synchronization pumps are driven by the transmission output shaft, they have a zero output with the vehicle stopped. Also, since the control pump is driven at engine RPM by the transmission input shaft, it has a fluid output determined by the engine speed, but will be at some positive value with the vehicle stopped. It can, thus, be readily seen that, whenever one of the synchronization pumps are connected in series hydraulically with the shift control pump, there will initially be a fluid deficit condition in the line connecting the two pumps and a non-return valve must be used to prevent a cavitation condition from occurring.

As the vehicle speed increases, the volumetric fluid output from the synchronization pump will catch up to and surpass that of the shift control pump. When this happens, a fluid excess condition will prevail, and this fluid excess is used to operate the respective lockup clutch for the range selected. As long as the vehicle speed is above this threshold level, the lockup clutch will remain engaged. As the vehicle forward speed decreases below the threshold level, the fluid output of the synchronization pump will no longer exceed that of the control pump and the lockup clutch will disengage.

In the preceding paragraphs, three synchronization pumps were mentioned. It should be recognized, however, that the number of synchronization pumps used must be equal to the number of lockup ranges desired. In some smaller cars it may be desirable to use only two lockup ranges, while for heavy duty applications such as highway transport tractor units and large four-wheel-drive farm tractors, four or more ranges might be desired. Also, regardless of the number of ranges used, each range must be individually selectable and this requirement is met by deploying a solenoid-operated selector valve for each range.

In addition to those provisions required to effect lockup at the desired vehicle forward speed, some provision is also required to decouple the basic transmission from the output shaft whenever lockup occurs and to allow it to operate unloaded. As well, some provision is required to automatically revert the transmission to the hydro-mechanical mode whenever the operator fully depresses the accelerator pedal. This provision is analogous to the "kickdown" or passing mode in a conventional automatic transmission. These provisions are described in detail in later paragraphs.

While the primary advantage of the subject transmission in smaller passenger cars, trucks and vans would be that a manual-shift level of fuel economy could be achieved with an automatic transmission, this level of fuel efficiency would be achieved in a transmission no more costly than a current automatic. But, in addition it would have many other features and capabilities that current automatic transmissions lack. For instance, a vehicle equipped with such a transmission could pull heavy loads indefinitely, whether in a lockup mode or not, without overheating. Thus no external cooling system would be required. It could provide up to three lockup ranges in even a small car with a transversely-mounted engine; whereas, current automatic transmissions in such cars do not usually have any overdrive capabilities. It would also allow such a transversely mounted engine to be moved closer to the vehicle centerline or, alternatively, to move the differential closer to the center line, permitting the drive shafts to be more equal in length.

For the mid-range transport trucks and those used for city and suburban cartage purposes such as garbage trucks, etc. this transmission would offer many benefits over current transmissions. Most of these trucks currently use manual-shift or standard automatic transmissions. Some use a multiple lockup type automatic transmission, but regardless of the type presently used, the subject transmission would provide superior capabilities at less cost.

For the heavy-duty highway transport tractor units and for the large four wheel drive farm tractors, both of which currently achieve mechanical level efficiencies by using the very expensive hydra-shift transmissions, the subject transmission would provide the same level of efficiency at a fraction of the cost.

BRIEF DESCRIPTION OF THE DRAWINGS

FIG. 6 is a top partial view of the transmission.

FIG. 7 is an enlarged cross-sectional view of range selector valve.

FIG. 8 is an enlarged partial cross-sectional view of the lockup clutches.

FIG. 9 is a cross-sectional view taken along the cutting plane 9—9 in FIGS. 3 and 4.

FIG. 10 is a partial cross-sectional view taken along the cutting plane 10—10 in FIG. 9.

FIG. 11 is a partial cross-sectional view taken along the cutting plane 11—11 in FIGS. 1 and 2.

FIG. 12 is a graph plotting the control pump output and the synchronization pump outlet both as a function of vehicle forward speed.

FIG. 13 illustrates three curves of the shift control pump as a function of vehicle speed.

In the drawings like characters of reference indicate corresponding parts in the different figures.

DESCRIPTION OF THE PREFERRED EMBODIMENTS

Figure 1:
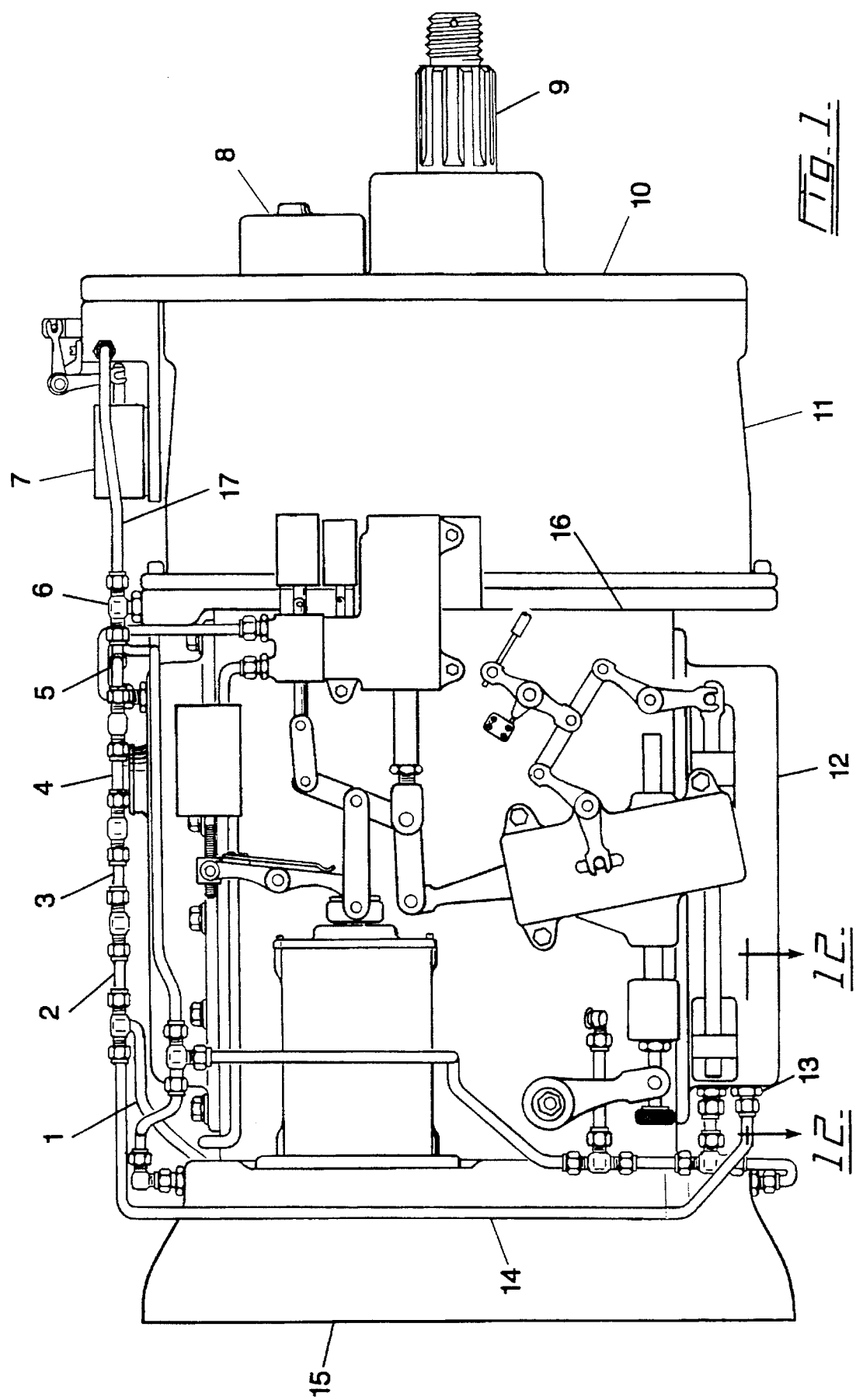
FIG. 1 is an orthographic side view of the transmission configured for a rear wheel drive vehicle.

Referring specifically to FIG. 1, this figure illustrates the preferred embodiment of the transmission in a typical rear wheel drive truck, van or passenger car application. In this embodiment, the transmission attaches to the flywheel end of a conventionally mounted engine by means of housing 15, while the output shaft 9 mates with the vehicle drive shaft to transmit power to the rear drive wheels. In FIG. 1, the main transmission housing 16, mode selector assembly 12 and housing 15 are essentially the same as those described in the aforementioned U.S. Pat. No. 5,203,747 with some slight additions made to accommodate the lockup provisions. In FIG. 1, item 11 is the lockup clutch housing and item 10 is the housing end cap. Item 8 is the housing for the range synchronization pumps and item 7 is one of a series of solenoid-operated range select valves. Items 1 through 6 and item 17 are hydraulic pipes shown in further detail in FIG. 6. Item 13 is the inlet fitting for the main fluid mode override shunt valve as shown in FIG. 12.

Figure 2:
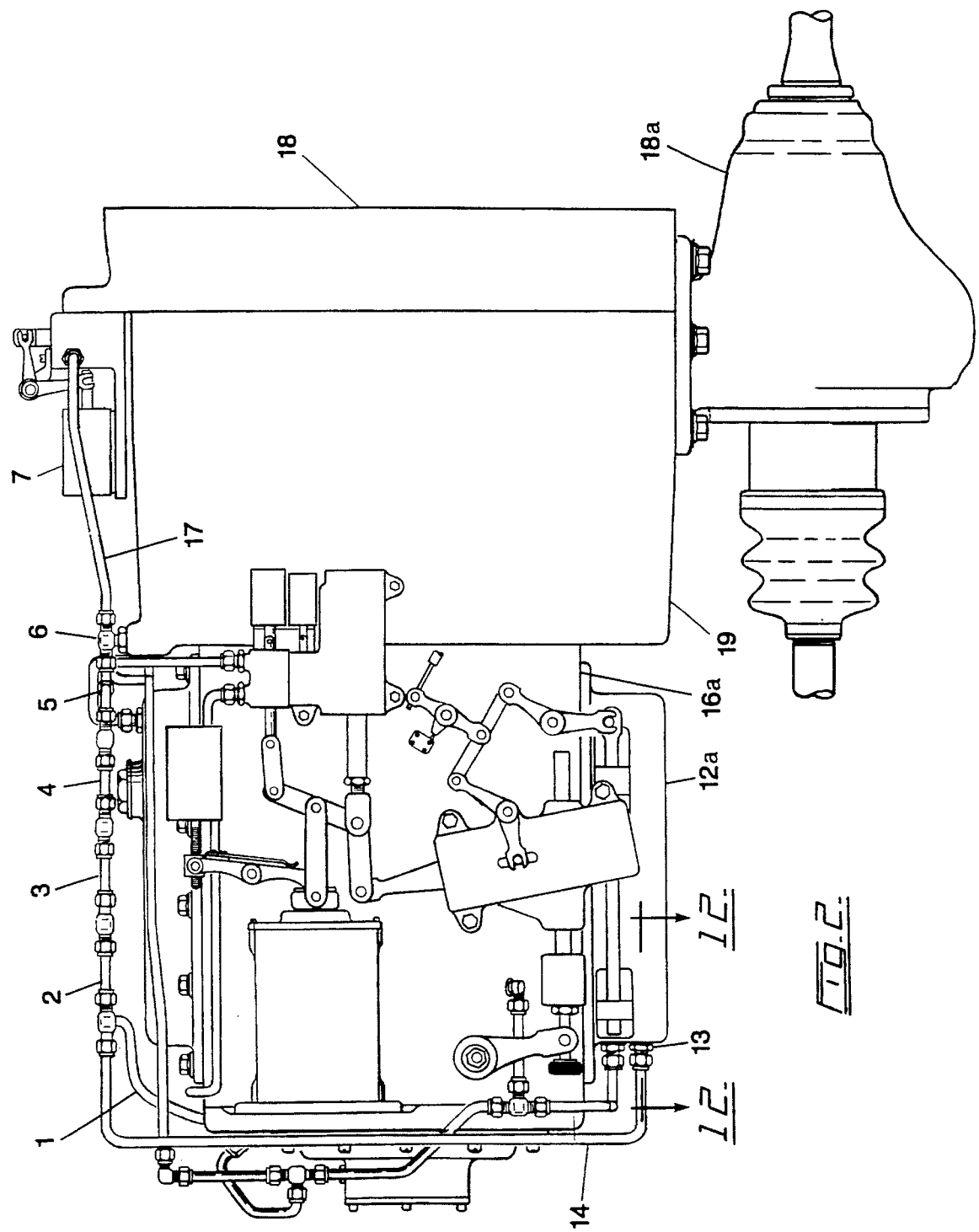
FIG. 2 is an orthographic rear view of the transmission configured for a front wheel drive vehicle.

Referring next to FIG. 2, reference numbers that are the same as in FIG. 1 refer to items that are identical in both configurations. Since this configuration is meant for a front-wheel-drive, transversely-mounted engine configuration, item 18 is the bell housing that attaches the transmission to the engine. Item 19 is the lockup clutch housing and item 18a is a standard front wheel drive differential. Mode selector assembly 12a and main transmission housing 16a are similar to items 12 and 16, respectively in FIG. 1.

Figure 3:
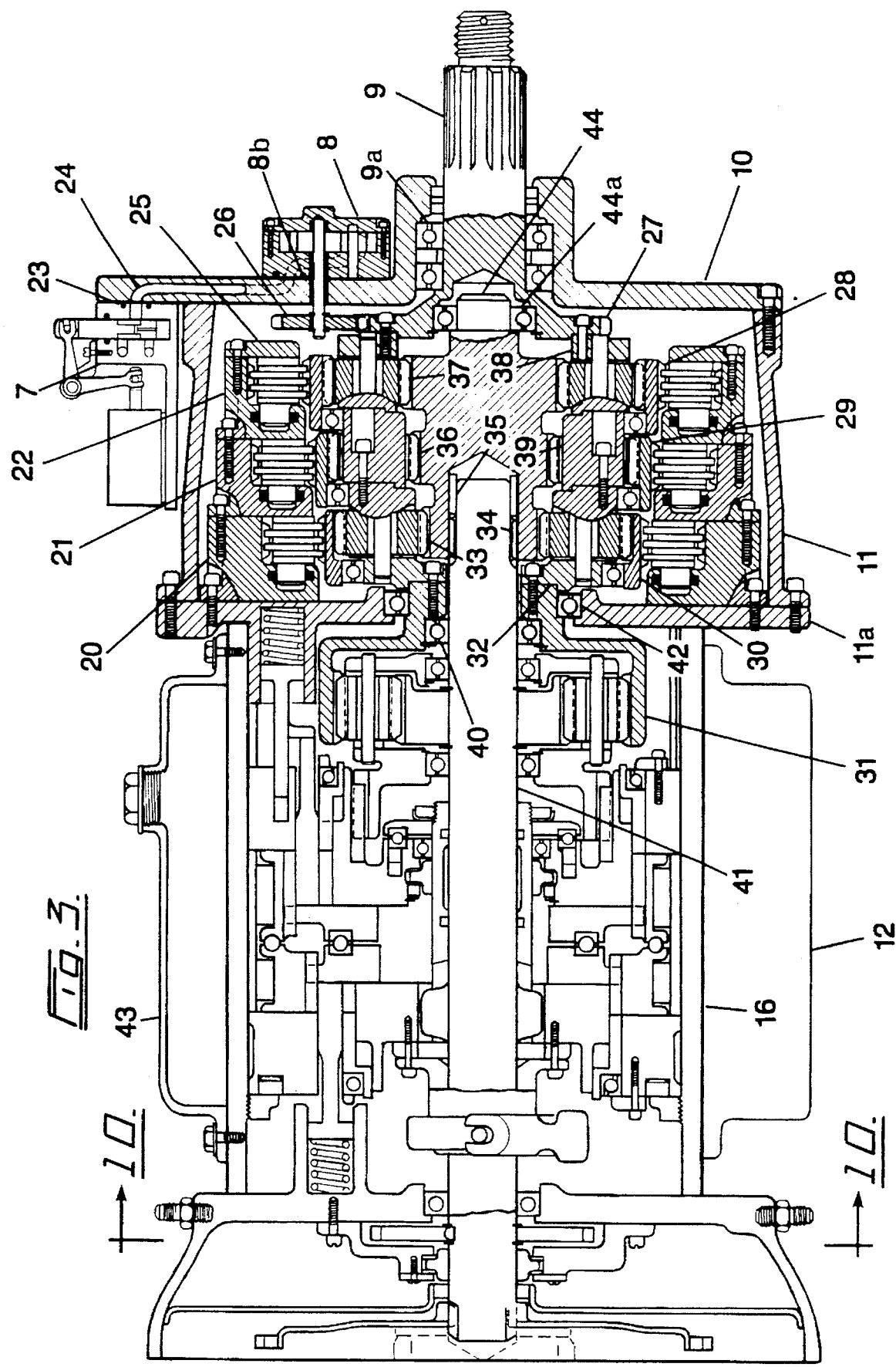
FIG. 3 is a cross-sectional view taken through the center line of the transmission in FIG. 1.
Figure 4:
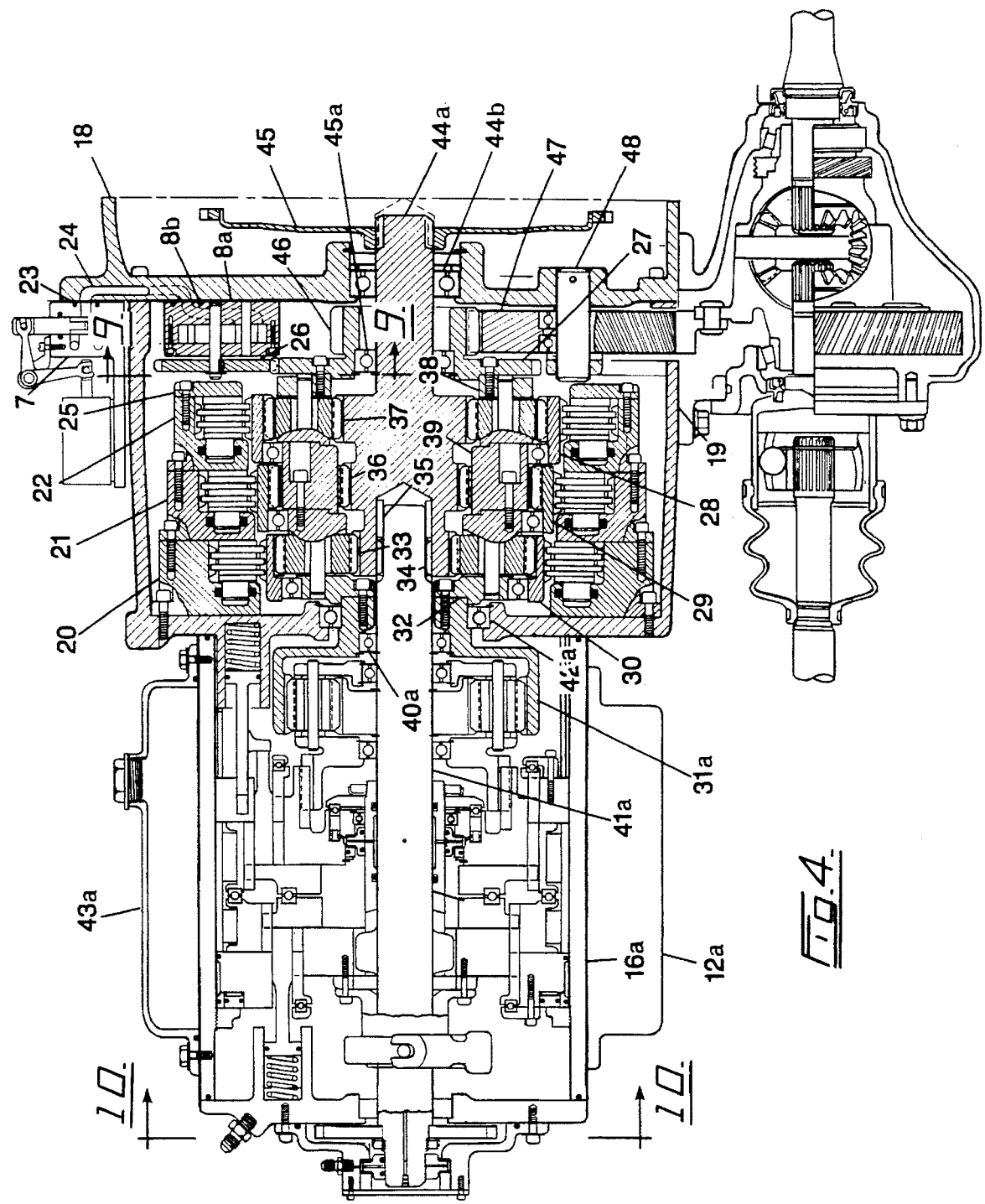
FIG. 4 is a cross-sectional view taken through the centerline of the transmission in FIG. 2.

FIGS. 3 and 4 illustrate the working elements of the transmission in front-wheel-drive and rear-wheel-drive configurations. In both configurations the lockup clutch mechanisms are essentially the same, and where items are identical, the same reference numbers are used.

In the front-wheel-drive variant, the engine flywheel 45 is spline coupled to shaft gear 44a which is integral with the composite sun gear. In this instance the shaft portion of shaft gear 44a is radially constrained in housing 18 by means of bearing 44b. Output power is via drive gear 46 and idler gear 47, the idler gear 47 is bearing mounted in housing 18 by means of pinned shaft 48 and transmits the output power to a conventional front-wheel-drive differential. Output gear 46 is radially constrained by bearing 45a and is bolted to planet carrier 38. Main drive shaft 41a, mode selector assembly 12a, main transmission housing 16a and fluid reservoir 43a correspond to the equivalent items 41, 12, 16 and 43 on the rear wheel drive variant, except that they are shown as being slightly smaller in the front-wheel-drive variant simply because, when deployed in a small front-wheel-drive passenger car the first lockup range would likely be at a lower range than that required in a large transport truck and, consequently, the continuously variable portion of the transmission would be used less, and could be relatively smaller.

From a purely functional point of view, the two transmissions are identical. Since the main drive shaft and multiple element sun gear are spline-coupled it makes no difference functionally whether the engine input is from the continuously variable (lefthand side) or from the lock-up (righthand side) portions of the transmission. FIGS. 3 and 4 also illustrate the physical location of the synchronization pumps 8 and 8a in both variants. In both instances, the pump drive gears 26 are driven via a drive gear 27 which is integral with the output elements—in the case of the rear-wheel-drive variant it is integral with output shaft 9, and in the case of the front-wheel drive variant it is integral with output gear 46.

In both instances, the output fluid from the pumps are directed via channels 24 to solenoid-operated selector valves 7. The fluid flow at the pump-to-housing interface is sealed via seals 8b, and at the housing-to-valve interface by seals 23.

The remainder of this description refers to the preferred embodiment of the lockup transmission configured for a rear wheel drive vehicle having three lockup output ranges.

FIG. 6 depicts a partial top view of the transmission, specifically illustrating the hydraulic piping and components which make up the hydraulic circuit. The output range 1, range 2 and range 3 selector valves 7, 7a, and 7b are connected at their respective inlets to the range synchronization pump outputs 24, 24a, and 24b, (see FIG. 9) and are connected at their first outlets 63 (see FIG. 7) to the reservoir return pipes 56, 56a, 56b and 50 which return fluid to the reservoir 43. The pressure lines 17, 17a and 17b connect the second outlets 64 of the respective range selector valves to the tee fittings 6, 6a and 6b which screw into the lockup clutch housings and direct fluid to the respective lockup clutches 20, 21, 22 (see FIG. 8). The other side of the tee fittings 6, 6a, and 6b are connected to pipes which, in turn, are connected to check valves 53, 54 and 55. The fluid outputs from the check valves are interconnected via pipes 5, 4, 3, 2 and 1 and fitting 49 from whence the fluid is directed internally to the input of the shift control pump 86 (see FIGS. 10 and 11). Fluid from pipe 3 is also directed via pipe 14 and fitting 13 (see FIG. 12) to the pressure side of mode override shunt valve 92. If fluid pressure becomes excessive it is relieved by returning fluid to the reservoir 43 via a pressure relief valve 52 and fitting 51 (see FIG. 6).

The shift control pump as described in the above copending patent application has been modified to accommodate the lockup mechanism. The pressure relief valve has been eliminated in the modified pump since one has been employed as part of the hydraulic circuit. The sources of fluid on the inlet side of the pump have also been changed.

FIG. 10 illustrates drive gear and inlet pipe 1 which directs fluid to the shift control pump 86 (see FIG. 11). The shift control pump, is driven from the main transmission input shaft (41 and 41a in FIGS. 3 and 4, respectively) by a drive gear 100 connected to the input shaft 41. The shift control pump 86 is, thus, driven continually at a speed proportional to the engine speed.

FIG. 11 is a cross-sectional view of the shift control pump 86. The pump 86 is located inside the transmission housing 16 and immersed in hydraulic fluid. The pump 86 comprises an internal gear 102, an outer ring gear 104, and a crescent 106 that separates the respective internal gear 102 and outer ring gear 104. An external gear 108 is located outside the transmission housing 16 and is meshed to and driven by the drive gear 100. The external gear 108 and internal gear 102 are fixed to and spaced apart along a shaft 110 which passes through the pump housing 86b.

The inlet coupling 49 communicates fluid output from the synchronization pump via the hydraulic circuit to the internal fluid channel 87 on the input side of the pump. Under conditions of fluid deficit which can occur during acceleration additional fluid input is supplied from a reservoir via check valve 86a.

The check valve 86a consists of a cylinder 112 which is connected to the pump casing, a valve seat 83, a valve ball 84, and a compression spring 85. The check valve ball 84 is held in place against valve seat 83 by spring 85 until low pressure on the pump side of the valve causes the ball 84 to become unseated and fluid to flow into the pump from the transmission housing.

As in the basic transmission pressurized fluid output is directed via internal drillings to a fluid flow outlet which directs the fluid to the hydraulic servo actuator.

Referring next to FIGS. 4 and 9 the range synchronization pumps 67 are gear type pumps mounted within the pump housing 8a on the interior of the lockup clutch housing 19. Each range synchronization pump 67, 67a and 67b, (see FIG. 9) includes an internal gear 112, an outer ring gear 114, and a crescent 116 that separates the respective internal gear 112 and outer ring gear 114. Each pump is driven by a gear 26 external to the pump housing. The drive gears 26 are meshed with and powered by a gear 27 integral with the output gear 46. The external gear 26 and internal gear 112 are fixed to and spaced apart along a shaft which passes through the lockup clutch housing 8a.

Each pump receives fluid from the reservoir at its inlet 68 and communicates pressurized fluid to the range selector valve via its outlet 24.

FIG. 7 shows a cross-sectional view of the range selector valves 7, 7a and 7b shown in FIG. 6. Each selector valve body 65 comprises an bore 118 which accepts a valve spool 59, a single inlet passage 61 connected to the outlet 24 (FIG. 9) of a synchronization pump, and two outlet passages; a first outlet 63 and a second outlet 64. The first outlet 63 of each valve is connected to the hydraulic circuit by hydraulic piping 56, 56a, and 56b (FIG. 6) for communication of pressurized fluid to the reservoir 43. The second outlet 64 of each valve is connected to a hydraulic pipe 17, 17a, 17b for communication of pressurized fluid to the shift control pump 86 (see FIG. 11), the lockup clutch 20 and mode override shunt valve 92 (see FIG. 12).

A lever 57 (FIG. 7) is pivotally mounted on the valve body by means of support bracket 58. The lever 57 is connected at one end to a solenoid 66 and at another to the valve spool 59. The valve spool 59 comprises an elongate member located within the bore 118 in the valve body 65. The elongate member has an annular recess 120 arranged such that when the valve spool is in a first position fluid flows through the first outlet 63 and when the valve spool is in a second position fluid flows through the second outlet 64. A bleed passage 62 is located within the valve spool which prevents a fluid lock from occurring within the valve. A fluid seal 60 is located near the open end of the opening 118 in the valve body.

Each range select valve 7 is operated by an operator selectable actuator 119 which is preferably a switch on the vehicle gear shift lever which energizes the solenoid 66 thereby moving lever 57. Lever 57 moves valve spool 59 from the first position to the second position allowing fluid to flow to the second outlet 64 and thereby to the shift control pump 86, the lockup clutch 20 and mode override shunt valve 92 housed within the mode selector assembly 12 (FIG. 12).

Referring to FIG. 6 the non-return check valves 53, 54, and 55 are spring biased ball type non-return valves which allow fluid to flow in one direction only. Each check valve 53, 54, and 55 lies in the hydraulic circuit between each lockup clutch 6, 6a, 6b and branches 3, 4, and 5 respectively in the hydraulic circuit which lead to the mode override shunt valve 92, the shift control pump 86, reservoir 43 and connect the lockup clutches to one another. The check valves prevent pressurized fluid which is being directed from the selected lockup clutch to the mode override shunt valve and the shift control pump from backing up and actuating the unselected lockup clutches. Any appropriate non-return valve may be substituted for the ball type valve.

FIG. 8 shows the lockup clutches as shown in FIGS. 3 and 4, and illustrates, in detail, the fluid path to the last lockup clutch 22. The fluid paths for lockup clutches 20 and 21 are similar. Coupler 69 connects to fitting 6 (see FIG. 6) and receives fluid from the outlet 64 of the range selector valve 7. Fluid passages 82, 70, 71 and 72 direct fluid to the pressure side of toroidally-shaped piston 75. One set of clutch pads 73 are spline-coupled to ring gear 29. One set of clutch plates 74 are spline-coupled to the clutch housing 22. Items 76, 77, 78, 79, 80 and 81 are the respective clutch pads, clutch plates and pistons in clutch housings 20 and 21.

When pressurized fluid is directed to the piston 75 the clutch pads 73 and plates 74 engage one another fixing the outer ring 28 of the corresponding planetary gear set in place preventing it from rotating.

Referring next to FIG. 12, the shunt valve 92 lies within the body of the mode selector assembly 12 between the main fluid flow crossover paths 88 and 90 and is connected to them by fluid flow shunt paths 91 and 93. The fluid flow shunt paths connect the valve 92 to the main fluid flow crossover paths 88 and 90. The shunt valve 92 comprises an bore 121 in the mode selector assembly 12 with a pressurized fluid inlet coupling 13 at one end, a compression spring 89 at the other end, and an elongate valve spool 122 slidably arranged therebetween being movable from a first position to a second position. The elongate valve spool 122 includes an annular recess 124 arranged such that when in the first position fluid flow between the fluid flow shunt paths 91 and 93 is prevented and when in the second position fluid flow between the fluid flow shunt paths 91 and 93 is allowed.

The shunt valve is 92 normally held in the first position by the compression spring 89. Whenever one of the lockup switches is selected and a lockup clutch is engaged, pressurized fluid is supplied to the shunt valve 92 from the synchronization pump, via pipe 1 and inlet coupling 13. When pressurized fluid is supplied the shunt valve moves into the second position connecting the fluid flow shunt paths 91 and 93 to one another thereby shunting fluid in either direction between the main fluid crossover paths 88 and 90 and disengaging the continuously variable portion of the transmission.

The lockup clutch mechanism (FIG. 3) comprises a lockup clutch housing 11, a plurality of lockup clutches, a plurality of planetary gear sets, a composite sun gear, and a lockup housing end cap 10. Each selectable output range requires a lockup clutch which has a corresponding planet gear set and gear element on the composite sun gear. In this embodiment the lockup clutch mechanism provides three output ranges and therefore requires three clutches, three planet gear sets, and three composite sun gear elements.

In the conventional rear wheel drive transmission as shown in FIG. 3, main drive shaft 41 is coupled to and is driven by the engine, while the output from the continuously variable portion of the transmission is via ring gear 31. The planet carriers 32 of the first lockup clutch is bolted to ring gear 31, and each successive planet carrier, 39 and 38, is bolted to the preceding one, with output shaft 9 being bolted to the last planet carrier 38. Thus ring gear 31, planet carriers 32, 39 and 38, and output shaft 9 form a single bolted assembly which is bearing mounted at the forward end by bearing 42 and at the rear end by bearings 9a. Planet gears 33, 36 and 37 are needle bearing-mounted in the planet carriers and mate with respective ring gears 30, 29 and 28. Each ring gear 30, 29 and 28 is spline coupled to the plates of its corresponding lockup clutch 20, 21 and 22.

A composite, triple-element sun gear 44 is spline-coupled to the main drive shaft by splines 34, and is radially constrained on the main drive shaft by bushing 35. At the output shaft, the composite sun gear is radially constrained by bearing 44a. Each geared element on the sun gear meshes with the planet gears of one of the corresponding planet gear sets.

FIG. 3 shows the lockup clutch housings 20, 21 and 22 and end cap 25 for lockup clutch housing 22. These clutch housings are successively built up, along with the respective clutch actuator disks and pads (see FIG. 8). Lockup clutch housing 20 is bolted to the transmission end cap 11a. Each successive lockup clutch housing serves to laterally constrain the preceding lockup clutch disk and brake pads, with the final lockup clutch disk and brake pads being constrained laterally by end cap 25.

During continuously variable operation when none of the lockup clutches are engaged, power output is from ring gear 31, through the bolted together planet carriers, and thence via output shaft 9. When the required output RPM has been achieved, the continuously variable portion of the transmission is simultaneously disengaged and one of the lockup clutches 20, 21, or 22 is engaged, thereby fixing the corresponding ring gear 28, 29, or 30 in place and holding it stationary. Power output is then transmitted via the main drive shaft 41, composite sun gear 44 and the respective planet gear and planet carrier to the output shaft 9.

Figure 5:
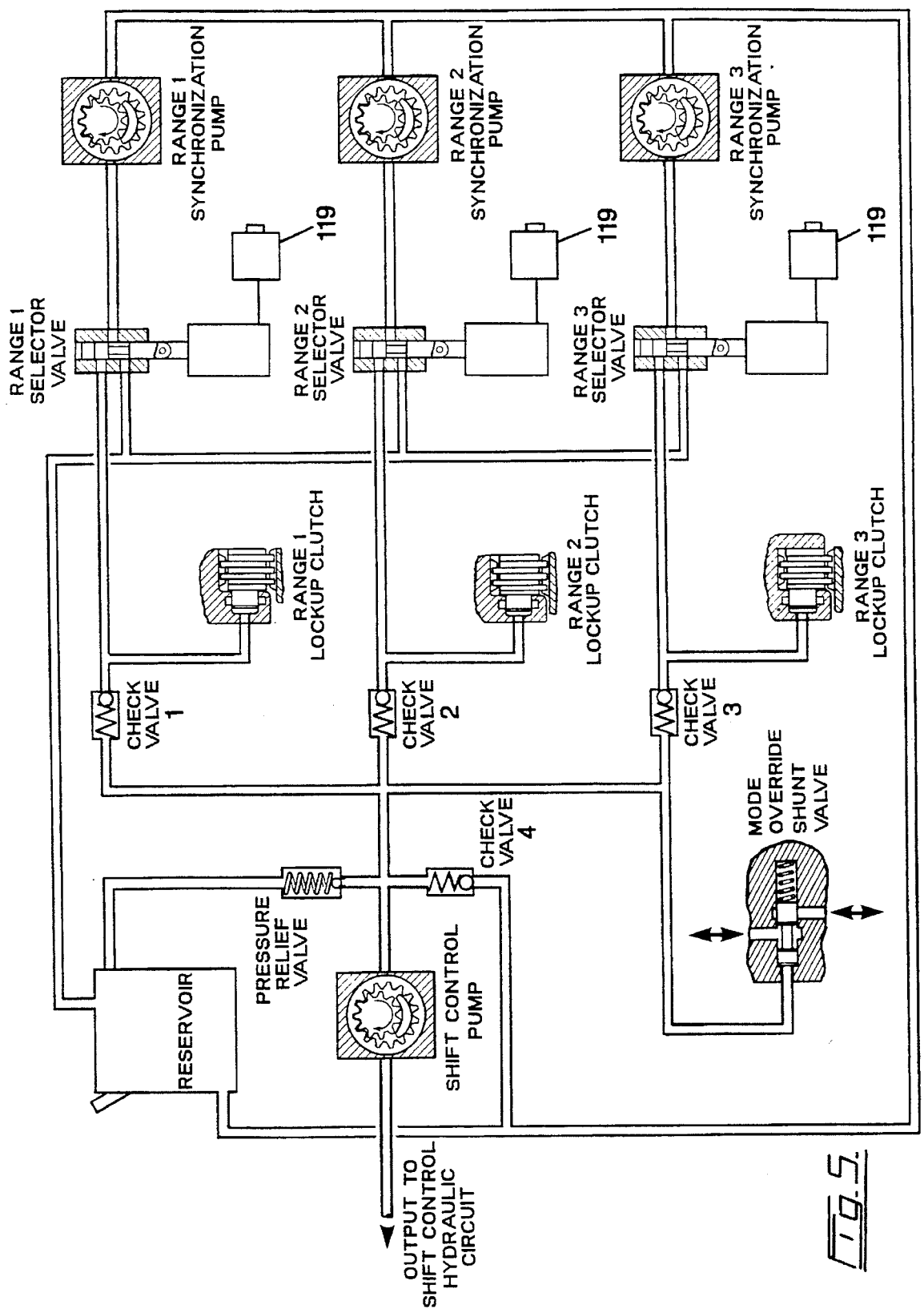
FIG. 5 is a schematic diagram of the lockup hydraulic circuitry.

When the transmission output is at zero and the vehicle is stopped, there is no output from the output range 1, 2 and 3 synchronization pumps. Since the synchronization pumps are driven directly from the transmission output, output from the synchronization pumps increases as the vehicle forward speed increases. In this embodiment the pumps have been selected such that the fluid output of the range 2 pump is incrementally greater than that of the range 1 pump, and that the range 3 pump is correspondingly greater than that of the range 2 pump. If the solenoids of none of the range selector valves are energized, the output fluid from the three synchronization pumps is simply shunted through the respective selector valve and returned to the reservoir via hydraulic pipes 56, 56a, 56b and 50 (see FIG. 5).

If the operator chooses to depress one of the range lockup switches on the vehicle gearshift lever then the corresponding solenoid is energized and the corresponding range 1, 2 or 3 selector valve 7, 7a, or 7b moves to the upper position as shown in FIG. 7. When this happens, the output fluid from the respective range synchronization pump 67, 67a, or 67b is ported through the respective range select valve and check valve 53, 54, or 55 and thence to the inlet of the shift control pump 86. While the vehicle is accelerating from the stopped position, there will initially be a fluid deficit in the path between the synchronization pump and the shift control pump and this fluid deficit will be made up via the check valve 86a in the shift control pump.

At such time as the output from the synchronization pump 67, 67a, 67b exceeds that of the shift control pump 86, a fluid excess situation will occur within the hydraulic control circuit. When this happens, the pressure P in the line rises to a level where it actuates the lockup clutch 20, 21, and 22 and the mode override shunt valve 92. The mode override shunt valve 92 is thereby repositioned to the right, which in turn permits fluid to be freely shunted between the two main fluid paths 88 and 90 in the transmission disengaging the continuously variable elements of the transmission. The pressure relief valve 52 relieves any excessive buildup of pressure in the line between the synchronization pump and the shift control pump, and check valves 53, 54 and 55 prevent back pressure from activating the other lockup clutches.

When the vehicle accelerator pedal is fully depressed, it opens switch contacts in the electrical circuit to the selector valve solenoids, preventing them from being energized and, thereby, disabling the lockup circuit. This reengages the continuously variable elements and the "kickdown" features of the basic transmission to downshift for rapid acceleration. Once the accelerator pedal is no longer held fully depressed, the transmission will return to normal lockup operation.

FIG. 13 illustrates, in more graphic detail, how the lockup circuits work. On a single graph, the volumetric outputs of the shift control pump and range synchronization pumps are plotted as a function of vehicle forward speed. As can be seen, the output of the range synchronization pumps as a function of vehicle forward speed are straight-lines starting at zero and increasing as the vehicle forward speed increases. On the other hand, the output of the shift control pump varies directly as the engine RPM varies, but is only indirectly related to vehicle forward speed.

FIG. 13 illustrates three typical curves of the shift control pump (dashed lines) as a function of vehicle forward speed. Note that in every instance of acceleration from zero, the shift control pump is already pumping at some positive value when the vehicle is stopped (engine at idle). However, as the vehicle accelerates, the three synchronization pumps will have outputs as shown. After initial startup, when the engine RPM decreases slightly, or levels off, the output of the synchronization pumps will quickly catch up to and surpass that of the shift control pump.

Depending upon which lockup range has been selected, lockup will occur at the point (shown circled on FIG. 13) where the synchronization pump output equals the shift control pump output. Once lockup occurs, the lockup circuit will not disengage until either the vehicle forward speed has decreased to the point where the synchronization pump output is again less than the shift control pump output, or if the vehicle accelerator pedal has been fully depressed.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An integrated hydro-mechanical lockup transmission for communicating power from a power source to a driven member comprising;

a hydro-mechanical transmission having an input shaft for receiving power from the power source at a variable input RPM, an output shaft for driving the driven member at a variable output RPM, and hydrodynamically linked transmission means including a hydraulic pump, a hydraulic motor, and a sun and planetary gear set having an outer ring gear, a planet carrier, and a plurality of planet gears mounted on the planet carrier for engaging the outer ring gear, said hydraulic pump, said hydraulic motor, and said sun and planetary gear set being arranged to provide for continuously varying the output RPM relative to the input RPM from forward through zero to reverse;

a lockup transmission comprising:

a rotatable input means comprising a composite sun gear being bearing mounted at each of its ends and having at least one gear element arranged in series along its length, and wherein there is one gear for each operator selectable output to input ratio;

a first linking means comprising a spline coupling at one end of each of the composite sun gear and the input shaft arranged such that the composite sun gear and input shaft are fixed together at the spline coupled ends and such that the input shaft and the composite sun gear are fixed axially and are free to rotate about a common axis;

a rotatable output means comprising at least one planetary gear set each having an outer ring gear, a planet carrier, and a plurality of planet gears mounted on the planet carrier for engaging said outer ring gear, said at least one planetary gear set being arranged in series with the outer ring gear of the hydrodynamically linked transmission means at one end and the output shaft at the other end, and wherein there is one at least one planetary gear set for each operator selectable output to input ratio;

a second linking means comprising fixing means fixing one planet carrier of said at least one planetary gear set to the outer ring gear of the hydrodynamically linked transmission means arranged such that each successive planet carrier of said at least one planetary gear set, is fixed to the preceding one with the output shaft being fixed to the last planet carrier, and such that said outer ring gear of the hydrodynamically linked transmission means, the said planet carrier, and the output shaft form a single assembly, are fixed axially, and are free to rotate about a common axis;

and lockup means for selecting one of the at least one planetary gear set thus providing at least one operator selectable output to input ratio;

and control system means comprising manually operable means for selecting one of said output to input ratio of the lockup transmission, and means responsive to output RPM and input RPM for disengaging the hydrodynamically linked transmission means and engaging the lockup means when the output RPM relative to the input RPM is above a threshold value, and for disengaging the lockup means and engaging the hydrodynamically linked transmission means when said output RPM relative to the input RPM falls below a threshold value.

2. An integrated hydro-mechanical lockup transmission according to claim 1 wherein the hydraulic pump and motor of the hydrodynamically linked transmission means each are of the internal gear type arranged in a back to back configuration with respect to one another, and each includes an internal gear, an external gear and a crescent that separates the respective internal gear and external gear, the internal gears being capped off by laterally constrained and rotatably supported internal gear plugs, and the external gears being laterally constrained and capped off by external gear plugs positioned between the two internal gears creating respective pump and motor working chambers, the internal gears and associated external gear plugs are laterally moveable by a control shaft which is displaceable in an axial direction causing the internal gears to engage a greater or lesser portion of the respective external gears such that the volumetric capacity of both pump and motor working chambers are made inversely variable to one another, and wherein the hydraulic pump and hydraulic motor each has an inlet and an outlet coupled by hydraulic coupling means;

and wherein the sun and planetary gear set has ratios which in conjunction with the relative volumetric capacities of said hydraulic pump and motor elements achieve a continuously variable, through zero output;

and wherein the hydraulic coupling means of the hydromechanical transmission comprise:

a first non-restrictive primary fluid flow crossover path connecting the pump outlet to the motor inlet;

a second non-restrictive primary fluid flow crossover path connecting the motor outlet to the pump inlet;

and wherein the input shaft is coupled to the internal gear of the pump such that the internal gear of the pump is free to move axially, and is coupled to the sun gear such that the sun gear rotates at the same rate as said internal gear;

the output shaft being connected to the ring gear of the sun and planetary gear set so as to transmit the output of the transmission mechanically in the form of rotary motion.

3. An integrated hydro-mechanical lockup transmission according to claim 1 wherein the lockup means comprise;

an outer housing;

at least one lockup clutch;

and a housing end cap;

wherein the ring gear of said at least one planetary gear set is spline coupled to a respective one of said at least one lockup clutch;

and wherein each selectable output range requires one lockup clutch for engaging one respective said planetary gear set.

4. An integrated hydro-mechanical lockup transmission according to claim 1 wherein each at least one gear element on the composite sun gear meshes with the planet gears of one corresponding at least one planet gear set.

5. A integrated hydro-mechanical lockup transmission according to claim 3 wherein the lockup means includes an individual housing for each respective said at least one lockup clutch and an end cap for the last individual housing, such that the individual housings are successively built up, along with respective clutch actuator plates and pads, and wherein the first individual housing is fixed to the transmission housing and wherein each successive individual housing is fixed to the preceding one and serves to laterally constrain the plates and pads, with the final lockup clutch plates and brake pads being constrained laterally by said end cap.

6. An integrated hydro-mechanical lockup transmission according to claim 1 wherein the means responsive to output RPM and input RPM comprises a hydraulic control circuit.

7. An integrated hydro-mechanical lockup transmission according to claim 6 wherein the hydraulic control circuit comprises:

hydraulic ducting for communication of pressurized fluid between hydraulic components, a shift control pump driven by the input shaft having a fluid inlet connected to the hydraulic ducting for accepting fluid flow from a range synchronization pump, a fluid outlet connected to external hydraulic piping for direction of pressurized fluid to a hydraulic servo actuator, and a non-return valve located at the fluid inlet for providing additional fluid to the shift control pump from a fluid reservoir;

at least one range synchronization pump driven by the output shaft having a fluid inlet connected to a fluid reservoir and a fluid outlet connected to the shift control pump inlet via the hydraulic ducting, each said at least one range synchronization pump having a different volumetric output and wherein there is one range synchronization pump for each operator selectable output to input ratio;

a non-return pressure relief valve located in the hydraulic ducting between the shift control pump inlet and the at least one range synchronization pump outlet for direction of excessively pressurized fluid to the fluid reservoir;

at least one lockup clutch having a housing and being connected to the hydraulic ducting between the shift control pump inlet and one respective at least one range synchronization pump outlet being actuated when a pressure of magnitude P occurs in the hydraulic ducting thereby engaging the corresponding respective said at least one planetary gear set, and deactuated when the magnitude of the pressure in the ducting is below P thereby disengaging the corresponding respective said at least one planetary gear set;

a mode override shunt valve connected to the hydraulic ducting between the at least one lockup clutches and the shift control pump inlet being actuated when a pressure of magnitude P occurs in the hydraulic ducting thereby disengaging the hydrodynamically linked transmission means and deactuated when the magnitude of the pressure in the ducting is below P thereby engaging the hydrodynamically linked transmission means;

and wherein relative volumetric outputs of each said at least one range synchronization pump and the shift control pump are such that a pressure increase of magnitude P will occur in the hydraulic ducting between each said at least one synchronization pump outlet and the shift pump inlet when a first specific output RPM to input RPM occurs thereby actuating the corresponding respective said at least one lockup clutch and the mode override valve, and such that at a second specific output RPM to input RPM the pressure decreases below P thereby deactuating the corresponding respective said at least one lockup clutch and mode override valve.

8. An integrated hydro-mechanical lockup transmission according to claim 7 wherein the hydraulic control circuit includes at least one range select valve having a fluid inlet connected to a respective one of the said at least one range synchronization pump outlets via the hydraulic ducting, two outlet passages the first fluid outlet and the second fluid outlet, said first fluid outlet being connected to the hydraulic ducting for communication of pressurized fluid to the reservoir, said second fluid outlet being connected to the hydraulic ducting for communication of pressurized fluid to the shift control pump, the lockup clutch, and the mode override shunt valve; and wherein only one said at least one range select valve is activated at a time and wherein there is one range select valve for each operator selectable output to input ratio.

9. An integrated hydro-mechanical lockup transmission according to claim 8 wherein the said at least one range selector valve comprises;

an opening for accepting a valve spool;

a lever pivotally mounted on the valve body by means of a support bracket and connected at one end to the valve spool;

a valve spool comprising an elongate member located within the opening in the valve body;

an annular recess located on the elongate member;

a first position such that when the valve spool is in the first position fluid flows through the first outlet a second position such that when the valve spool is in the second position fluid flows through the second outlet;

a solenoid connected to the lever at an end opposite the valve spool for movement of said lever and valve spool from the first position to the second position when energized;

and a bleed passage located within the valve spool which prevents a fluid lock from occurring within the valve.

10. An integrated hydro-mechanical lockup transmission according to claim 7 wherein the hydraulic control circuit includes a non-return check valve located in the hydraulic ducting between each respective said at least one lockup clutch and the shift control pump inlet, and the mode override shunt valve arranged such that pressurized fluid is allowed to pass only in a direction from one respective said at least one range synchronization pump to one respective said at least one lockup clutch through the check valve to the shift control pump inlet and the mode override shunt valve and wherein there is one non-return check valve for each operator selectable output to input ratio.

11. An integrated hydro-mechanical lockup transmission according to claim 1 wherein the manually operable means for selecting one of said output to input ratios comprises at least one operator acutatable switch for energizing the solenoid on a respective said at least one range select valve.

12. An integrated hydro-mechanical lockup transmission according to claim 7 wherein the shift control pump being located inside the transmission housing and immersed in hydraulic fluid comprises a miniaturized gear type pump, an external gear, and a non-return valve wherein;

the miniaturized gear type pump includes an internal gear, an outer ring gear and a crescent that separates the respective internal gear and outer ring gear, said gear type pump receives fluid from the fluid inlet and transfers it to the fluid outlet;

the external gear is meshed with and powered by a gear on the transmission input shaft;

the external and internal gears are fixed to and spaced apart along a rotatable shaft;

the non-return valve consists of a cylinder connected to the pump casing, a valve seat, a valve ball, and a compression spring arranged such that the valve ball is held in place against the valve seat by the compression spring until low pressure on the pump side of the valve causes the ball to become unseated and fluid to flow into the pump from the transmission housing.

13. An integrated hydro-mechanical lockup transmission according to claim 7 wherein each said at least one range synchronization pump comprises a gear type pump mounted within a pump housing on the exterior of the lockup means transmission housing end cap, said gear type pump including a fluid inlet, a fluid outlet, an internal gear, an outer ring gear, and a crescent separating the respective internal gear and outer ring gear, an external gear located outside the pump within the lockup clutch housing such that the external gear and internal gear are fixed to and spaced apart along a shaft which passes through the lockup clutch housing end cap said external gear being meshed with and powered by a drive gear mounted on the output shaft and wherein said gear type pump receives fluid from the fluid inlet and transfers it to the fluid outlet.

14. An integrated hydro-mechanical lockup transmission according to claim 7 wherein each said at least one lockup clutch comprises;

a coupling connected to the hydraulic ducting for receiving pressurized fluid from the outlet of one of said at least one range selector valve;

a hydraulically actuated toroidally shaped piston;

a fluid passage for directing pressurized fluid to said toroidally-shaped piston;

a set of clutch pads spline-coupled to the corresponding outer ring gear of the respective planetary gear set;

a set of clutch plates spline-coupled to the individual housing;

said piston being arranged at one end of the individual housing with said pads, and plates arranged alternately in series such that when pressurized fluid of magnitude P is directed to the toroidally shaped piston, the piston causes the clutch pads and plates to engage one another thereby fixing the outer ring of the corresponding planet gear set in place preventing it from rotating.

15. An integrated hydro-mechanical lockup transmission according to claim 10 wherein the non-return check valve comprises a cylinder, a valve seat, a valve ball, and a compression spring arranged within the cylinder on a side of the ball valve opposite the valve seat such that the check valve ball is biased towards the valve seat by the spring and wherein pressure on the ball acting in a direction against the spring causes the ball to become unseated and fluid to flow through the valve.

16. An integrated hydro-mechanical lockup transmission according to claim 7 wherein the mode override shunt valve lies between the main fluid flow crossover paths and is connected to them by fluid flow shunt paths.

17. An integrated hydro-mechanical lockup transmission according to claim 16 wherein the mode override shunt valve comprises a chamber having a pressurized fluid inlet coupling at one end and a compression spring at another end, an elongate valve spool slidably arranged therebetween being movable from a first position to a second position, said elongate valve includes an annular recess arranged such that when in the first position fluid flow between the fluid flow shunt paths is prevented and when in the second position fluid flow between the fluid flow shunt paths occurs, and wherein the shunt valve is normally held biased in the first position by the compression spring, such that when pressurized fluid of magnitude P is supplied to the shunt valve from the synchronization pump the shunt valve moves into the second position connecting the fluid flow shunt paths to one another thereby shunting fluid between the main fluid crossover paths and disengaging the hydrodynamically linked transmission.

* * * * *